(12) United States Patent
Tsujioka et al.

(10) Patent No.: US 8,728,657 B2
(45) Date of Patent: May 20, 2014

(54) METHOD FOR PRODUCING LITHIUM DIFLUOROPHOSPHATE AND NONAQUEOUS ELECTROLYTE BATTERY USING THE SAME

(75) Inventors: Shoichi Tsujioka, Iruma-gun (JP); Aiichiro Fujiwara, Ube (JP); Toshinori Mitsui, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 418 days.

(21) Appl. No.: 12/518,012

(22) PCT Filed: Feb. 19, 2008

(86) PCT No.: PCT/JP2008/052688
§ 371 (c)(1),
(2), (4) Date: Jun. 5, 2009

(87) PCT Pub. No.: WO2008/111367
PCT Pub. Date: Sep. 18, 2008

(65) Prior Publication Data
US 2010/0323240 A1    Dec. 23, 2010

(30) Foreign Application Priority Data

Mar. 12, 2007   (JP) ................................ 2007-062087

(51) Int. Cl.
*H01M 6/04* (2006.01)
(52) U.S. Cl.
USPC ........... 429/188; 429/189; 210/754; 210/753; 252/182.32
(58) Field of Classification Search
USPC .......................... 429/188, 189; 210/754, 753; 252/182.32, 182.5
See application file for complete search history.

(56) References Cited

U.S. PATENT DOCUMENTS

| | | | |
|---|---|---|---|
| 6,197,205 B1 * | 3/2001 | Tsujioka et al. | 210/754 |
| 2008/0102376 A1 * | 5/2008 | Kato et al. | 429/332 |
| 2008/0305402 A1 | 12/2008 | Kato et al. | |
| 2010/0119956 A1 | 5/2010 | Tokuda et al. | |

FOREIGN PATENT DOCUMENTS

| | | |
|---|---|---|
| JP | 11-67270 A | 3/1999 |
| JP | 2000-123867 A | 4/2000 |
| JP | 3439085 A | 6/2003 |
| JP | 2005-53727 A | 3/2005 |
| JP | 2005-219994 A | 8/2005 |
| JP | 2005-306619 A | 11/2005 |
| WO | WO 2006043538 A1 * | 4/2006 ............ H01M 10/40 |
| WO | WO 2006/137177 A1 | 12/2006 |
| WO | WO 2008/126800 A1 | 10/2008 |

OTHER PUBLICATIONS

Andriy V. Plakhotnyk et al., "Hydrolysis in the system LiPF6—propylene carbonate—dimethyl carbonate—H2O", Journal of Fluorine Chemistry 126 (2006), pp. 27-31.*
Andriy V. Plakhotnyk, et al., "Hydrolysis in the system LiPF6—propylene carbonate—dimethyl carbonate—H2O", Journal of Fluorine Chemistry 126 2005 pp. 27-31.
International Search Report including English translation dated May 20, 2008 (Ten (10) pages).
European Search Report dated Aug. 23, 2011 (nine (9) sheets).
Yang et al., "Thermal Stability of LiPF6 Salt and Li-Ion Battery Electrolytes Containing LiPF6", Journal of Power Sources, Oct. 20, 2006, vol. 161, No. 1, pp. 573-579 (seven (7) sheets).
Farooq et al., "Alkali Metal Salts of Perfluorinated Complex Anions. Effective Reagents for Nucleophilic Fluorination", The Journal of Organic Chemistry, Apr. 1, 1994, vol. 59, No. 8, pp. 2122-2124 (three (3) sheets).
Farooq, Omar, "Nucleophilic Fluorination of Alkoxysilane with Alkali Metal Hexafluorophosphate—Part 1", Journal of Fluorine Chemistry, Dec. 5, 1997, vol. 86, No. 2, pp. 189-197 (nine (9) sheets).

* cited by examiner

*Primary Examiner* — Zachary Best
(74) *Attorney, Agent, or Firm* — Crowell & Moring LLP

(57) ABSTRACT

An object of the present invention is to provide: a production method for commercially advantageously producing lithium difluorophosphate or an electrolyte solution containing the lithium difluorophosphate, the lithium difluorophosphate serving as an additive useful for improving performance of a nonaqueous electrolyte battery; and a nonaqueous electrolyte battery employing the electrolyte solution for the nonaqueous electrolyte battery which solution contains the lithium difluorophosphate produced by the production method. To provide an electrolyte solution for a nonaqueous electrolyte battery which solution contains lithium difluorophosphate, in such a manner as to produce lithium difluorophosphate in the electrolyte solution by reacting a halide other than a fluoride, $LiPF_6$ and water in a nonaqueous solvent, the lithium difluorophosphate serving as an additive useful for improving performance of the nonaqueous electrolyte battery.

6 Claims, No Drawings

METHOD FOR PRODUCING LITHIUM DIFLUOROPHOSPHATE AND NONAQUEOUS ELECTROLYTE BATTERY USING THE SAME

TECHNICAL FIELD

The present invention relates to a commercially and economically outstanding method for producing lithium difluorophosphate which is to be used for a nonaqueous electrolyte battery, and to the nonaqueous electrolyte battery using an electrolyte solution for use in the nonaqueous electrolyte battery and containing lithium difluorophosphate.

BACKGROUND ART

In recent years, attention has been focused on small storage systems tailored to high energy density applications including information-related equipment and communication equipment such as personal computers, video cameras, digital still cameras and mobile phones and on large ones tailored to power applications including auxiliary power supplies for electric vehicles, hybrid vehicles and fuel cell vehicles and electric power storages. As a candidate, a nonaqueous electrolyte battery such as a lithium-ion battery, a lithium battery and a lithium ion capacitor has been diligently developed.

Most of these nonaqueous electrolyte batteries have already gone into actual use; however, these are not satisfying in terms of durability in the various uses, for example, in a long period of use under high temperatures or in the use for automotive vehicle, since these are remarkably deteriorated particularly at temperatures of not lower than 45° C.

In general, a nonaqueous electrolyte solution or that quasi-solidified with a gelling agent is used as an ion conductor in these nonaqueous electrolyte batteries, and is arranged in such a manner that aprotic one selected from ethylene carbonate, propylene carbonate, dimethyl carbonate, diethyl carbonate, ethyl methyl carbonate and the like and any combination thereof is used as a solvent and that a lithium salt such as $LiPF_6$, $LiBF_4$, $(CF_3SO_2)_2NLi$ and $(C_2F_5SO_2)_2NLi$ is used as a solute.

As a means of improving the nonaqueous electrolyte batteries in durability e.g. cycle characteristics and high-temperature storage characteristics, it has hitherto been considered to optimize various battery components such as the positive or negative active material. Nonaqueous electrolyte solution-related technologies are no different therefrom, in which it is proposed to inhibit, with various additives, the electrolyte solution from decomposing on an active positive or negative electrode surface and therefore from deteriorating. For example, a proposition made by Japanese Patent Provisional Publication No. 2000-123867 is to improve the electrolyte solution in battery characteristics with the addition of vinylene carbonate. This method is for preventing the electrolyte solution from decomposing on the electrode surface by coating the electrode with a polymer film formed by polymerization of vinylene carbonate, whose problem is that lithium ions also have difficulty in passing through the film so that the internal resistance is increased.

In Japanese Patent Publication No. 3439085, it is disclosed that high-temperature cycle characteristics are improved by the effect of the film formed on the electrode's interface by adding lithium difluorophosphate to the electrolyte solution. However, the synthesis of lithium difluorophosphate thus used as an additive is so difficult that an effective production method applicable to industrial production has not been established. Japanese Patent Provisional Publication No. 2005-219994 discloses that lithium difluorophosphate is produced by reacting lithium hexafluorophosphate with silicon dioxide at a reaction temperature of 50° C.; however, it requires a very long time until the end of the reaction, and more specifically, three days. Though a method of increasing the reaction temperature is conceivable in order to improve the reaction rate, lithium hexafluorophosphate begins to decompose when the reaction temperature exceeds 60° C. to cause deterioration of the electrolyte solution, which is also problematic. Further, in a method for producing lithium difluorophosphate by reacting hexafluorophosphate with water (Non-Patent Document 1), pure lithium difluorophosphate has not been obtained since acids such as hydrogen fluoride, difluorophosphoric acid and monofluorophosphoric acid are generated and additionally such acids are hard to be removed. Moreover, lithium difluorophosphate isolated from the solution is unstable among difluorophosphates and is acceleratingly decomposed due to the coexistence of the above-mentioned acids, so as to have never been actually isolated.

Patent Document 1: Japanese Patent Provisional Publication No. 2000-123867

Patent Document 2: Japanese Patent Publication No. 3439085

Patent Document 3: Japanese Patent Provisional Publication No. 2005-219994

Non-Patent Document 1: J. Fluorine Chem. 126 (2005) 27

DISCLOSURE OF THE INVENTION

Problems to be Solved by the Invention

An object of the present invention is to provide a method for industrially producing: lithium difluorophosphate which serves as an additive useful for improving performance of a nonaqueous electrolyte battery, or an electrolyte solution containing the lithium difluorophosphate, at low cost; and a nonaqueous electrolyte battery employing lithium difluorophosphate produce by this production method.

Means for Solving the Problems

As a result of eagerly making studies in view of the above-mentioned problems, the present inventors have found a method for industrially producing lithium difluorophosphate or lithium difluorophosphate containing $LiPF_6$ at low cost by removing a by-product hydrogen fluoride produced from a halide other than a fluoride in a reaction while reacting $LiPF_6$ (employed commonly as an electrolyte salt for a nonaqueous electrolyte battery) with water in a nonaqueous solvent, and a nonaqueous electrolyte battery employing lithium difluorophosphate produced by this production method, thereby having reached the present invention.

Therefore, the present invention is to provide a method for producing lithium difluorophosphate, characterized by reacting a halide other than a fluoride, $LiPF_6$ and water in a nonaqueous solvent. Additionally, in the above-mentioned method, the method for producing lithium difluorophosphate containing $LiPF_6$ is characterized in that a mole ratio of $LiPF_6$ to water is within a range of from 1:1 to 1:0.002. The method for producing lithium difluorophosphate is characterized in that: the nonaqueous solvent is at least one solvent selected from the group consisting of cyclic carbonates, chain carbonates, cyclic esters and chain esters; or that the halide is at least one kind selected from the group consisting of lithium chloride, lithium bromide, silicon tetrachloride, phosphorus trichloride, acetyl chloride, acetyl bromide, propionyl chloride and oxalyl chloride. Further, the present invention is to provide a method for producing an electrolyte solution for a nonaqueous electrolyte battery which solution contains lithium difluorophosphate, characterized by purifying and adjusting the lithium difluorophosphate produced by any one of the above-mentioned methods so that a concentration of the lithium difluorophosphate in the electrolyte solution for the nonaqueous electrolyte battery is within a range of from 0.01 to 5.0 wt %. Furthermore, the present invention is to provide in a nonaqueous electrolyte battery including at least a positive electrode, a negative electrode formed of lithium or a negative electrode material capable of catching and releasing lithium, and an electrolyte solution for a nonaqueous electrolyte battery, the nonaqueous electrolyte battery being characterized by using the electrolyte solution for the nonaqueous electrolyte battery which solution contains the lithium difluorophosphate produced by any one of the above-mentioned methods.

Effects of the Invention

According to the present invention, it becomes possible to provide: a method for industrially advantageously producing lithium difluorophosphate (which serves as an additive useful for improving performance of a nonaqueous electrolyte battery) or an electrolyte solution containing lithium difluorophosphate at low cost; and a nonaqueous electrolyte battery employing the electrolyte solution for nonaqueous electrolyte battery which solution contains lithium difluorophosphate produced by this production method.

BEST MODE FOR CARRYING OUT THE INVENTION

Hereinafter, the present invention will be discussed in detail.

A method for producing lithium difluorophosphate according to the present invention is characterized in that lithium difluorophosphate is produced through a process for reacting a halide other than a fluoride, $LiPF_6$ and water in a nonaqueous solvent and that acids formed thereby are removed.

The nonaqueous solvent used in the method for producing lithium difluorophosphate according to the present invention includes one or more kinds of solvent selected from the group consisting of cyclic carbonates, chain carbonates, cyclic esters and chain esters. Concrete examples thereof are cyclic carbonates such as propylene carbonate, ethylene carbonate and butylene carbonate, chain carbonates such as diethyl carbonate, dimethyl carbonate and methyl ethyl carbonate, cyclic esters such as γ-butyrolactone and γ-valerolactone, and chain esters such as methyl acetate and methyl propionate. In the present invention, the nonaqueous solvent may be one kind thereof, or two or more kinds thereof arbitrarily combined at arbitrary ratios in accordance with purposes.

Though the concentration of $LiPF_6$ in the nonaqueous solvent used in the present invention is not limited (or may be arbitrary) in the case of producing lithium difluorophosphate simply, its lower limit is preferably 0.01 mol/L and more preferably 0.1 mol/L, while its upper limit is preferably 3.0 mol/L and more preferably 2.5 mol/L. The concentration of lower than 0.01 mol/L is thin even if all quantity is converted into lithium difluorophosphate by reaction, which is, therefore, not economical since concentration and crystallization performed at the occasion of isolation of lithium difluorophosphate require a long period of time. Meanwhile, the concentration of higher than 3.0 mol/L also is not preferable, since it increases the viscosity of the solution thereby impairing the smoothness of the reaction and making the solvent easily decomposed by a side reaction.

The added amount of water is not particularly limited or is arbitrarily determined. The reaction between $LiPF_6$ and water progresses quantitatively, so that the added amount of water is preferably determined by calculating back from the required amount of lithium difluorophosphate. However, it is necessary to obtain a mixture solution of $LiPF_6$ and lithium difluorophosphate in order to produce a $LiPF_6$-containing nonaqueous electrolyte solution which contains a high purity lithium difluorophosphate serving as an additive useful for improving performance of a nonaqueous electrolyte battery, and therefore the mole ratio of water to $LiPF_6$ is preferably within a range of from 0.002:1 to 1:1. When this mole ratio is higher than 1 (1:1=1), the molar ratio of lithium difluorophosphate to $LiPF_6$ becomes not lower than 0.5 so as to be no longer dissolved in the solution to be precipitated, which makes it difficult to control the concentration of the electrolyte solution and therefore not preferable. Meanwhile, when the above mole ratio is lower than 0.002 (0.002:1=0.002), an obtained amount of lithium difluorophosphate is excessively small so that the effect of improving performance of the battery cannot be sufficiently obtained. In addition, it is commonly required to control the nonaqueous solvent (used for the nonaqueous electrolyte solution in order to prevent the deterioration of the nonaqueous electrolyte battery) to have a water concentration of not higher than 10 ppm, by previously and highly removing water; however, the production method according to the present invention does not particularly need the removal of water from the nonaqueous solvent, and additionally has the economic advantage where an impurity water in the nonaqueous solvent also is usable for the reaction.

The reaction conditions under which $LiPF_6$ and water are reacted with the addition of water, such as the reaction temperature and the reaction time, are not particularly limited and therefore the reaction can be made under arbitrary conditions in accordance with the circumstances; however, the upper limit of the reaction temperature is preferably not higher than 70° C. and more preferably not higher than 60° C. while the lower limit thereof is preferably not lower than −20° C. and more preferably not lower than 0° C. The reaction temperature of higher than 70° C. causes decomposition of $LiPF_6$ to form $PF_5$ who can decompose the solvent, and therefore is not preferable. Meanwhile, the reaction temperature of lower than −20° C. is not economic since it slows down the progress of the reaction. Concerning the reaction time, it is preferable to ensure it, while monitoring the progress of the reaction, until a time when consumption of water is completed. The reaction terminates in about three hours under normal conditions.

When lithium difluorophosphate is produced by the reaction between $LiPF_6$ and water, acids such as hydrogen fluoride, hexafluorophosphoric acid and difluorophosphoric acid are formed as by-products. However, these acids are strong in interaction against the nonaqueous solvent, so that purification thereof using vapor pressure such as distillation and degasification is difficult. Meanwhile, purification using common chemical reactions, e.g. neutralization is also not a preferable method since this purification produces water as a by-product thereby generating acids. In addition to this, there arises a disadvantage where the reaction becomes difficult to progress in order to keep its equilibrium unless the by-product hydrogen fluoride is removed so as to expand the reaction time. In the present invention, these acids are reacted with a halide other than a fluoride which halide is added in the present invention, thereby being converted into acids having a high vapor pressure, such as hydrogen chloride, hydrogen bromide and hydrogen iodide. Thereafter, the acids obtained by the conversion are removed by purification such as distillation and degasification while a precipitated insoluble component (e.g. a metal fluoride) is removed by filtration, thereby obtaining the nonaqueous electrolytic solution containing lithium difluorophosphate low in acid content.

Halide used in the reaction is at least one selected from the group consisting of chloride, bromide and iodide. Concrete examples of the halide are lithium chloride, lithium bromide, lithium iodide, sodium chloride, sodium bromide, sodium iodide, potassium chloride, potassium bromide, potassium iodide, calcium chloride, calcium bromide, calcium iodide, magnesium chloride, magnesium bromide, magnesium iodide, cesium chloride, cesium bromide, cesium iodide, barium chloride, barium bromide, barium iodide, tetramethylammonium chloride, tetramethylammonium bromide, tetramethylammonium iodide, aluminum trichloride, aluminum tribromide, aluminum triiodide, silicon tetrachloride, silicon tetrabromide, silicon tetraiodide, phosphorus trichloride, phosphorus tribromide, phosphorus triiodide, acetyl chloride, acetyl bromide, acetyl iodide, propionyl chloride, propionyl bromide, propionyl iodide, oxalyl chloride, oxalyl bromide and oxalyl iodide. Particularly preferable examples of these are lithium chloride, lithium bromide, silicon tetrachloride, phosphorus trichloride, acetyl chloride, acetyl bromide, propionyl chloride and oxalyl chloride, for the reasons that: these are reacted at a fast rate so as to be able to increase productivity from an industrial viewpoint; and these do not leave behind positive ions not pertinent to a lithium-ion battery or to a lithium ion capacitor, in the electrolyte solution.

The usage amount of halide used in the reaction is not particularly limited. However, in the reaction according to the present invention acids can be removed in proportion to the number of halogen elements that halide has, and therefore the lower limit of the usage amount of halide is $1/n$ mole and more preferably $1.2/n$ mole while the upper limit thereof is $5/n$ mole and more preferably $3/n$ mole to acid generated by the reaction between $LiPF_6$ and water, where n is the number of halogen elements that 1 molecule of halide has. The usage amount of less than $1/n$ mole is not preferable since the generated acids are to remain thereby adversely affecting performance of the battery. Meanwhile, the usage amount of more than $5/n$ mole leaves plenty of unreacted halide and therefore it is not economic and raises a disadvantage of the need for recovery thereof.

In a case where the thus obtained lithium difluorophosphate contains $LiPF_6$ and the nonaqueous solvent which are compounds to be used for the electrolyte solution for the nonaqueous electrolyte battery, the contained $LiPF_6$ and nonaqueous solvent may be used for a part of or the whole of the electrolyte solution for the nonaqueous electrolyte battery at the time of preparation of the electrolyte solution. With this, the electrolyte solution for the nonaqueous electrolyte battery, containing lithium difluorophosphate as the additive and at least $LiPF_6$ as a solute can be obtained. Though the electrolyte solution for nonaqueous battery according to the present invention contains lithium difluorophosphate, the combined use of a commonly known other additive therewith may be allowed if necessary.

From the electrolyte solution for the nonaqueous electrolyte battery which solution is produced by the method according to the present invention, impurities resulting from the solvent, which are to adversely affect the nonaqueous electrolyte battery, (e.g. water, alcohols, and acidic components) are removed by reaction. Therefore, the electrolyte solution according to the present invention is superior to those produced by a method free from an acidic component-removing mechanism or by a conventional method of mixing materials produced by other methods, in battery performances such as durability.

A method of preparing the electrolyte solution for the nonaqueous electrolyte battery is not particularly limited; however, in a case of using a reaction product solution as a part of the electrolyte solution for the nonaqueous electrolyte battery, the electrolyte solution may be subjected to component adjustment such that lithium difluorophosphate has a certain concentration as discussed below, by removing the nonaqueous solvent or $LiPF_6$ through distillation, concentration or the like or by adding the nonaqueous solvent, the solute or other additives.

In a case of using the electrolyte solution for the nonaqueous electrolyte battery without adjusting lithium difluorophosphate produced by the production method according to the present invention, materials are prepared at a preparation stage of reaction such that each component after the reaction has a composition agreeing with those in the electrolyte solution for the nonaqueous electrolyte battery. With this, the materials can be directly used as the electrolyte solution for the nonaqueous electrolyte battery, after reaction and purification.

In a case of preparing an electrolyte solution for the nonaqueous electrolyte battery which solution contains lithium difluorophosphate and does not contain $LiPF_6$, water twice as much as the number of moles of $LiPF_6$ may be reacted and then the total amount thereof may be converted into lithium difluorophosphate. As an alternative to this, the electrolyte solution obtained according to the present invention may be prepared to have a certain concentration in such a manner as to concentrate the solution in which $LiPF_6$ coexists with lithium difluorophosphate by decompression to selectively precipitate lithium difluorophosphate, and then extract the lithium difluorophosphate by filtration and dissolve it in the nonaqueous solvent together with an electrolyte salt other than $LiPF_6$, such as $LiBF_4$.

The upper limit of the concentration of lithium difluorophosphate in the electrolyte solution for the nonaqueous electrolyte battery which solution is produced by purifying and preparing lithium difluorophosphate obtained by reacting a halide other than a fluoride, $LiPF_6$ and water in a nonaqueous solvent is preferably 5.0 wt %, more preferably 3.0 wt % and much more preferably 2.0 wt %, while the lower limit of the same is preferably 0.01 wt %, more preferably 0.1 wt % and much more preferably 0.2 wt %. A concentration of lower than 0.01 wt % reduces the nonaqueous electrolyte solution in durability resulting from lithium difluorophosphate, such as cycle characteristics and high-temperature storage characteristics, and does not sufficiently produce the effect of suppressing gasification. Meanwhile, if a lithium difluorophosphate concentration in the electrolyte solution for the nonaqueous electrolyte battery exceeds 5.0 wt %, there may arise a fear that the electrolyte solution decreases in ionic conduction and increases in internal resistance.

When the electrolyte solution obtained by the production method according to the present invention is used for the nonaqueous electrolyte battery, it is allowed to arbitrarily add lithium salts as the solute. Concrete examples of lithium salts are electrolytic ones such as $LiPF_6$, $LiBF_4$, $LiClO_4$, $LiAsF_6$, $LiSbF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiPF_3(C_3F_7)_3$, $LiB(CF_3)_4$, $LiBF_3(C_2F_5)$, $LiBF_2(C_2O_4)$, $LiPF_4(C_2O_4)$, and $LiPF_2(C_2O_4)_2$. As the solute, one kind of these may be used singly, or two or more kinds of these may be arbitrarily combined at arbitrary ratios in accordance with purposes. Of these, $LiPF_6$, $LiBF_4$, $(CF_3SO_2)_2NLi$ and $(C_2F_5SO_2)_2NLi$ are preferable from the viewpoint of energy density, output characteristics, battery life and the like.

The concentration of these solutes in total is not particularly limited; however, the lower limit thereof is preferably 0.5 mol/L, more preferably 0.7 mol/L and much more preferably 0.9 mol/L, while the upper limit thereof is preferably 2.5 mol/L, more preferably 2.2 mol/L and much more preferably 2.0 mol/L. When the solute concentration is less than 0.5 mol/L, ionic conductivity is decreased so as to reduce the nonaqueous electrolyte battery in cycle characteristics and in output characteristics. Meanwhile, a solute concentration exceeding 2.5 mol/L increases the viscosity of the electrolyte solution so as to lower ionic conductivity, thereby raising a fear of reducing the nonaqueous battery in cycle characteristics and output characteristics.

Unless the effect of the present invention is impaired, commonly known additives may be added to the electrolyte solution for the nonaqueous electrolyte battery which solution is obtained by the production method according to the present invention, at arbitrary ratios. Concrete examples of the additives are compounds having the overcharge-prevention effect, the film-formation effect on the negative electrode and the positive electrode-protection effect, such as cyclohexylbenzene, biphenyl, t-butylbenzene, vinylene carbonate, vinylethylene carbonate, difluoroanisole, fluoroethylene carbonate, propane sultone and dimethylvinylene carbonate. Additionally, the electrolyte solution for the nonaqueous electrolyte battery may be used in the form of quasi-solid obtained by a gelling agent or a cross-linked polymer, as in use for a nonaqueous electrolyte battery called "lithium polymer battery".

Then, the configuration of the nonaqueous electrolyte battery according to the present invention will be discussed. The nonaqueous electrolyte battery according to the present invention is characterized by comprising: the electrolyte solution for the nonaqueous electrolyte battery which solution is obtained by the production method according to the present invention; and other components used in common nonaqueous electrolyte batteries. More specifically, the nonaqueous electrolyte battery according to the present invention comprises the positive and negative electrodes capable of catching and releasing lithium, a current collector, a separator and a case.

Examples of material for the negative electrode which material is capable of catching and releasing lithium may include lithium metal, an alloy and an intermetallic compound of lithium and other metals, various carbon materials, artificial graphite, natural graphite, metal oxides, metal nitrides, activated carbon, and conductive polymers, though not particularly limited.

In a case of lithium battery and lithium-ion battery, material for the positive electrode is not particularly limited. Examples of the material may include: lithium-containing transition metal complex oxides such as $LiCoO_2$, $LiNiO_2$, $LiMnO_2$ and $LiMn_2O_4$; a lithium-containing transition metal complex oxide in which two or more transition metals of the above-mentioned lithium-containing transition metal complex oxides are combined; a lithium-containing transition metal complex oxide obtained by substituting other metals for a part of the transition metals of the above-mentioned lithium-containing transition metal complex oxides; oxides such as $TiO_2$, $V_2O_5$ and $MoO_3$; sulfides such as $TiS_2$ and $FeS$; conductive polymers such as polyacetylene, poly(para-phenylene), polyaniline and polypyrrole; activated carbon; radical-generating polymers; graphite; and carbon materials.

The positive and negative electrodes are respectively shaped into a sheet upon addition of a conductive material (e.g. acetylene black, ketjen black, carbon fiber and graphite) and a binding agent (e.g. polytetrafluoroethylene, polyvinylidene fluoride and SBR resin), thereby serving as electrode sheets.

Examples of the separator provided for preventing contact between the positive and negative electrodes are nonwoven clothes and porous sheets formed of polypropylene, polyethylene, paper, glass fibers or the like.

The nonaqueous battery is assembled from the above-mentioned components, in the shape of a coin, a cylinder, a cuboid, an aluminum laminate sheet or the like.

The present invention will be more readily understood with reference to the following Examples.

Example 1

182.4 g (1.2 mol) of $LiPF_6$ was dissolved into 700 g of ethyl methyl carbonate with the addition of 7.2 g (0.4 mol) of water and 34.0 g (0.8 mol) of lithium chloride, and then stirred for 1 hour at a temperature of 20° C. The thus obtained reaction solution was analyzed by 19F-NMR and $^{31}$P-NMR, by which it was found that the reaction solution contained 152.0 g (1.0 mol) of $LiPF_6$ and 21.4 g (0.2 mol) of lithium difluorophosphate and progressed generally quantitatively.

In the subsequent purifying operation, the reaction solution was filtered to remove a precipitated lithium fluoride upon removing a by-product hydrogen chloride, at a temperature of 30° C. and under a reduced pressure of 133 Pa, thereby obtaining 755.2 g of an ethyl methyl carbonate solution containing 18.8 wt % of $LiPF_6$ and 2.7 wt % of lithium difluorophosphate. Water content of the ethyl methyl carbonate solution was analyzed by the Karl Fischer method thereby being found to be lower than 10 ppm which is the smallest possible value for quantitative analysis. Further, free acid of the solution was analyzed by the titration method thereby being found to be 20 ppm in terms of HF.

In preparation of an electrolyte solution, 387.1 g of ethylene carbonate was added to the purified solution and then stirred sufficiently, thereby obtaining 1143 g of the electrolyte solution having; a $LiPF_6$ concentration of 1.0 mol/L; a lithium difluorophosphate concentration of 1.8 wt %; and a volume ratio between ethylene carbonate and ethyl methyl carbonate of 1:2.

A cell of a lithium-ion battery was produced by using the above-mentioned electrolyte solution, $LiCoO_2$ as a positive electrode and graphite as a negative electrode, and then a charge/discharge test for battery was actually performed thereon. The cell was produced as follows.

5 parts by weight of polyvinylidene fluoride (PVDF) serving as a binder and 5 parts by weight of acetylene black serving as a conductive material were mixed with 90 parts by weight of a $LiCoO_2$ powder with the addition of N-methyl pyrrolidone, thereby obtaining a paste. The paste was applied to an aluminum foil and then dried, to produce a positive electrode body for the test. Meanwhile, 10 parts by weight of polyvinylidene fluoride (PVDF) serving as the binder was mixed with 90 parts by weight of graphite powder with the addition of N-methyl pyrrolidone, thereby obtaining a slurry. This slurry was applied to a copper foil and then dried for 12 hours at a temperature of 150° C., to produce a negative electrode body for the test. Thereafter, a separator formed of polyethylene was impregnated with the electrolyte solution, thereby assembling an aluminum laminate-sheathed 50 mAh cell.

With the cell produced by the method as discussed above, the charge/discharge test was conducted at an environment temperature of 60° C. Both charge and discharge were performed at a current density of 0.35 mA/cm², and a charge/discharge cycle in which charge was carried out up to 4.2 V and kept thereat for 1 hour while discharge was carried out up to 3.0 V was repeated. Then, a discharge capacity retention after 500 cycles, and a cell resistance and a generated gas amount in the cell after 500 cycles and at a temperature of 23° C. were measured thereby evaluating a degree of cell deterioration. A capacity retention was expressed as a percentage of a discharge capacity obtained after 500 cycles relative to that obtained at an early stage. Results of the evaluation are shown in Table 1. A discharge capacity retention, a cell resistance and a generated gas amount, which were obtained after 500 cycles, were 72%, 13Ω and 0.6 ml, respectively.

Example 2

152.0 g (1.0 mol) of $LiPF_6$ was dissolved into 2000 g of ethyl acetate with the addition of 36.0 g (2.0 mol) of water and 170.0 g (4.0 mol) of lithium chloride, and then stirred for 3 hours at a temperature of 50° C. under a reduced pressure of 133 Pa while removing a generated hydrogen chloride, thereby obtaining a slurry.

In the subsequent purifying operation, the slurry was filtered to recover a solid. The obtained solid was dried under a reduced pressure of 133 Pa at a temperature between 60 to 100° C. for 12 hours, thereby obtaining 199.3 g of a mixture of lithium difluorophosphate and lithium fluoride, the mixture containing 51 wt % of lithium difluorophosphate. It was found that water content was smaller than 10 ppm which is the smallest possible value for quantitative analysis and that free acid was smaller than 20 ppm which is the smallest possible value for quantitative analysis.

In preparation of an electrolyte solution, a total volume of 19.6 g of the obtained mixture and 94.0 g of $LiBF_4$ was fixed at 500 ml with a mixture solution having a volume ratio between ethylene carbonate and γ-butyrolactone of 1:4. Then, lithium fluoride insoluble in this mixture solution was removed by filtration, thereby obtaining the electrolyte solution having: a $LiBF_4$ concentration of 2.0 mol/L; a lithium difluorophosphate concentration of 1.6 wt %; and a volume ratio between ethylene carbonate and γ-butyrolactone of 1:4.

With the above-mentioned electrolyte solution, the charge/discharge test for battery was actually carried out by the method similar to that in Example 1. Results of the evaluation are shown in Table 1. A discharge capacity retention, a cell resistance and a generated gas amount, which were obtained after 500 cycles, were 57%, 62Ω and 0.6 ml, respectively.

Example 3

228.0 g (1.5 mol) of $LiPF_6$ was dissolved into 700 g of diethyl carbonate with the addition of 18.0 g (1.0 mol) of water and 87.0 g (0.51 mol) of silicon tetrachloride, and then stirred for 1 hours at a temperature of 20° C. Thereafter, the thus produced reaction solution was analyzed by 19F-NMR and 31P-NMR, by which it was found that the reaction solution contained 152.0 g (1.0 mol) of $LiPF_6$ and 54.0 g (0.5 mol) of lithium difluorophosphate and progressed generally quantitatively.

In the subsequent purifying operation, by-products (hydrogen chloride and silicon tetrafluoride) were removed from the reaction solution under a reduced pressure of 133 Pa at a temperature of 30° C., thereby obtaining 833.5 g of a diethyl carbonate solution containing 18.2 wt % of $LiPF_6$ and 6.5 wt % of lithium difluorophosphate. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm in terms of HF.

In preparation of an electrolyte solution, 244.2 g of ethylene carbonate and 98.1 g of dimethyl carbonate were added to the purified solution and then stirred sufficiently, thereby obtaining 1176 g of the electrolyte solution having; a $LiPF_6$ concentration of 1.0 mol/L; a lithium difluorophosphate concentration of 4.6 wt %; and a volume ratio among ethylene carbonate, dimethyl carbonate and diethyl carbonate of 2:1:7.

With the above-mentioned electrolyte solution, the charge/discharge test for battery was actually carried out by the method similar to that in Example 1. Results of the evaluation are shown in Table 1. A discharge capacity retention, a cell resistance and a generated gas amount, which were obtained after 500 cycles, were 83%, 9Ω and 0.7 ml, respectively.

Example 4

182.4 g (1.2 mol) of $LiPF_6$ was dissolved into a mixture solution formed of 700 g of dimethyl carbonate and 395.0 g of ethylene carbonate, with the addition of 0.04 g (0.002 mol) of water and 0.28 g (0.002 mol) of phosphorous trichloride, and then stirred for 1 hours at a temperature of 20° C. Thereafter, the thus produced reaction solution was analyzed by 19F-NMR and 31P-NMR, by which it was found that the reaction solution contained 182.1 g (1.2 mol) of $LiPF_6$ and 0.11 g (0.001 mol) of lithium difluorophosphate and progressed generally quantitatively.

In the subsequent purifying operation, by-products (hydrogen chloride, phosphorous trifluoride and unreacted phosphorous trichloride) were removed from the reaction solution under a reduced pressure of 133 Pa at a temperature of 20° C., thereby obtaining 887 g of a dimethyl carbonate-ethylene carbonate solution containing 35.6 wt % of $LiPF_6$ and 0.02 wt % of lithium difluorophosphate. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm which is the smallest possible value for quantitative analysis in terms of HF.

In preparation of an electrolyte solution, 301.4 g of ethyl methyl carbonate was added to the purified solution and then stirred sufficiently, thereby obtaining 1187 g of the electrolyte solution having; a $LiPF_6$ concentration of 1.2 mol/L; a lithium difluorophosphate concentration of 0.01 wt %; and a volume ratio among ethylene carbonate, dimethyl carbonate and ethyl methyl carbonate of 1:1:1.

With the above-mentioned electrolyte solution, the charge/discharge test for battery was actually carried out by the method similar to that in Example 1. Results of the evaluation are shown in Table 1. A discharge capacity retention, a cell resistance and a generated gas amount, which were obtained after 500 cycles, were 77%, 10Ω and 0.8 ml, respectively.

Example 5

182.4 g (1.2 mol) of $LiPF_6$ was dissolved into 900 g of ethyl methyl carbonate with the addition of 7.2 g (0.4 mol) of water and 125.6 g (1.6 mol) of acetyl chloride, and then stirred for 5 hours at a temperature of 45° C. Thereafter, the thus produced reaction solution was analyzed by 19F-NMR and 31P-NMR, by which it was found that the reaction solution contained 152.0 g (1.0 mol) of $LiPF_6$ and 21.4 g (0.2 mol) of lithium difluorophosphate and progressed generally quantitatively.

In the subsequent purifying operation, by-products (hydrogen chloride and an excessive amount of acetyl chloride) were removed from the reaction solution under a reduced pressure of 133 Pa at a temperature of 60° C., thereby obtaining 803.4 g of an ethyl methyl carbonate solution containing 18.9 wt % of $LiPF_6$ and 2.7 wt % of lithium difluorophosphate. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm which is the smallest possible value for quantitative analysis in terms of HF.

In preparation of an electrolyte solution, 411.8 g of ethylene carbonate was added to the purified solution and then stirred sufficiently, thereby obtaining 1216 g of the electrolyte solution having; a $LiPF_6$ concentration of 1.0 mol/L; a lithium difluorophosphate concentration of 1.8 wt %; and a volume ratio between ethylene carbonate and ethyl methyl carbonate of 1:2.

With the above-mentioned electrolyte solution, the charge/discharge test for battery was actually carried out by the method similar to that in Example 1. Results of the evaluation are shown in Table 1. A discharge capacity retention, a cell resistance and a generated gas amount, which were obtained after 500 cycles, were 74%, 12Ω and 0.5 ml, respectively.

Example 6

182.4 g (1.2 mol) of $LiPF_6$ was dissolved into 700 g of ethyl methyl carbonate with the addition of 7.2 g (0.4 mol) of water and 69.6 g (0.8 mol) of lithium bromide, and then stirred for 3 hours at a temperature of 30° C. Thereafter, the thus produced reaction solution was analyzed by 19F-NMR and 31P-NMR, by which it was found that the reaction solution contained 152.0 g (1.0 mol) of $LiPF_6$ and 21.4 g (0.2 mol) of lithium difluorophosphate and progressed generally quantitatively.

In the subsequent purifying operation, a by-product hydrogen bromide was removed from the reaction solution under a reduced pressure of 133 Pa at a temperature of 40° C. and additionally a precipitated lithium fluoride was removed by filtration, thereby obtaining 763.2 g of an ethyl methyl carbonate solution containing 18.9 wt % of $LiPF_6$ and 2.7 wt % of lithium difluorophosphate. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm which is the smallest possible value for quantitative analysis in terms of HF.

In preparation of an electrolyte solution, 391.2 g of ethylene carbonate was added to the purified solution and then stirred sufficiently, thereby obtaining 1155 g of the electrolyte solution having; a $LiPF_6$ concentration of 1.0 mol/L; a lithium difluorophosphate concentration of 1.8 wt %; and a volume ratio between ethylene carbonate and ethyl methyl carbonate of 1:2.

With the above-mentioned electrolyte solution, the charge/discharge test for battery was actually carried out by the method similar to that in Example 1. Results of the evaluation are shown in Table 1. A discharge capacity retention, a cell resistance and a generated gas amount, which were obtained after 500 cycles, were 74%, 12Ω and 0.6 ml, respectively.

Example 7

182.4 g (1.2 mol) of $LiPF_6$ was dissolved into 700 g of γ-butyrolactone with the addition of 7.2 g (0.4 mol) of water and 34.0 g (0.8 mol) of lithium chloride, and then stirred for 1 hour at a temperature of 20° C. Thereafter, the thus produced reaction solution was analyzed by 19F-NMR and 31P-NMR, by which it was found that the reaction solution contained 152.0 g (1.0 mol) of $LiPF_6$ and 21.4 g (0.2 mol) of lithium difluorophosphate and progressed generally quantitatively.

In the subsequent purifying operation, the reaction solution was filtered to separate a precipitated lithium fluoride under a reduced pressure of 133 Pa at a temperature of 30° C. upon removing a by-product hydrogen chloride, thereby obtaining 829.4 g of a γ-butyrolactone solution containing 17.4 wt % of $LiPF_6$ and 2.5 wt % of lithium difluorophosphate. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm in terms of HF.

In preparation of an electrolyte solution, 292.4 g of ethylene carbonate was added to the purified solution and then stirred sufficiently, thereby obtaining 1168 g of the electrolyte solution having; a $LiPF_6$ concentration of 1.0 mol/L; a lithium difluorophosphate concentration of 1.8 wt %; and a volume ratio between ethylene carbonate and γ-butyrolactone of 1:3.

With the above-mentioned electrolyte solution, the charge/discharge test for battery was actually carried out by the method similar to that in Example 1. Results of the evaluation are shown in Table 1. A discharge capacity retention, a cell resistance and a generated gas amount, which were obtained after 500 cycles, were 64%, 23Ω and 0.1 ml, respectively.

Example 8

A cell of a hybrid capacitor was produced by using the electrolyte solution of Example 1, an activated carbon as a positive electrode and graphite as a negative electrode, and then a charge/discharge test for battery was actually performed thereon. The cell was produced as follows.

80 parts by weight of a phenol resin-based activated carbon activated by water vapor and having a specific surface area of 1800 $m^2$/g, 80 parts by weight of polytetrafluoroethylene and 10 parts by weight of acetylene black were mixed well, and then ethanol was added thereto and kneaded. The kneaded substance was shaped into a sheet having a thickness of 0.5 mm. The sheet was affixed to an aluminum foil and dried, thereby producing a positive electrode body for the test. Meanwhile, 10 parts by weight of polyvinylidene fluoride (PVDF) serving as a binder was mixed with 90 parts by weight of graphite powder with the addition of N-methylpyrrolidone, thereby obtaining a slurry. This slurry was applied to a copper foil and then dried for 12 hours at a temperature of 150° C., to produce a negative electrode body for the test. Thereafter, a separator formed of polyethylene was impregnated with the electrolyte solution, thereby assembling an aluminum laminate-sheathed 10 mAh cell.

With the cell of the hybrid capacitor, produced by the method as discussed above, the charge/discharge test was conducted at an environment temperature of 60° C. Both charge and discharge were performed at a current density of 0.35 mA/$cm^2$, and a charge/discharge cycle in which charge was carried out up to 4.0 V and kept thereat for 1 hour while discharge was carried out up to 2.0 V was repeated. Then, a discharge capacity retention after 500 cycles, and a cell resistance and a generated gas amount in the cell after 500 cycles and at a temperature of 23° C. were measured thereby evaluating a degree of cell deterioration. A capacity retention was expressed as a percentage of a discharge capacity obtained after 500 cycles relative to that obtained at an early stage. Results of the evaluation are shown in Table 1. A discharge capacity retention, a cell resistance and a generated gas amount, which were obtained after 500 cycles, were 98%, 7Ω and 0.3 ml, respectively.

Example 9

182.4 g (1.2 mol) of $LiPF_6$ was dissolved into a mixture solution of 700 g of γ-butyrolactone and 292.4 g of ethylene carbonate with the addition of 7.2 g (0.4 mol) of water and 148.0 g (1.6 mol) of propionyl chloride, and then stirred for 1 hour at a temperature of 50° C. Thereafter, the thus produced reaction solution was analyzed by 19F-NMR and 31P-NMR, by which it was found that the reaction solution contained 152.0 g (1.0 mol) of $LiPF_6$ and 21.4 g (0.2 mol) of lithium difluorophosphate and progressed generally quantitatively.

In the subsequent purifying operation, a by-product hydrogen chloride and an excessive amount of propionyl chloride were removed from the reaction solution under a reduced pressure of 133 Pa at a temperature of 30° C., thereby obtaining 1168 g of an electrolyte solution having; a $LiPF_6$ concentration of 1.0 mol/L; a lithium difluorophosphate concentration of 1.8 wt %; and a volume ratio between ethylene carbonate and γ-butyrolactone of 1:3. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm which is the smallest possible value for quantitative analysis in terms of HF.

Example 10

182.4 g (1.2 mol) of $LiPF_6$ was dissolved into 1300 g of propylene carbonate with the addition of 7.2 g (0.4 mol) of water and 123.0 g (1.0 mol) of acetyl bromide, and then stirred for 1 hour at a temperature of 60° C. Thereafter, the thus produced reaction solution was analyzed by 19F-NMR and 31P-NMR, by which it was found that the reaction solution contained 152.0 g (1.0 mol) of $LiPF_6$ and 21.4 g (0.2 mol) of lithium difluorophosphate and progressed generally quantitatively.

In the subsequent purifying operation, a by-product hydrogen bromide and an excessive amount of acetyl bromide were removed from the reaction solution under a reduced pressure of 133 Pa at a temperature of 30° C., thereby obtaining 1450 g of an electrolyte solution having a $LiPF_6$ concentration of 1.0 mol/L and a lithium difluorophosphate concentration of 1.6 wt %. Water content of this solution was analyzed by the Karl Fischer method thereby being found to be lower than 10 ppm which is the smallest possible value for quantitative analysis. Further, free acid of the solution was analyzed by the titration method thereby being found to be 20 ppm which is the smallest possible value for quantitative analysis in terms of HF.

Comparative Example 1

182.4 g (1.2 mol) of $LiPF_6$ was dissolved into 700 g of ethyl methyl carbonate with the addition of 7.2 g (0.4 mol) of water, and then stirred for 1 hour at a temperature of 50° C. Thereafter, the thus produced reaction solution was analyzed by 19F-NMR and 31P-NMR, by which it was found that the reaction solution contained 166.4 g (1.1 mol) of $LiPF_6$, 7.6 g (0.07 mol) of lithium difluorophosphate and 3.4 g (0.03 mol) of lithium monofluorophosphate.

In the subsequent purifying operation, a by-product hydrogen fluoride was removed from the reaction solution under a reduced pressure of 133 Pa at a temperature of 60° C. Upon concentrating the solution until its amount was reduced to the half, free acid contained in the solution was analyzed by the titration method. With this, it was found that the solution contained 3.6 wt % of the free acid in terms of HF. Since the removal of the free acid is difficult, the charge/discharge test for battery could not be performed.

Comparative Example 2

The reaction similar to that in Comparative Example 1 was made with the exception that the reaction temperature was changed to 20° C. As a result of this, a hydrolytic reaction was significantly slow so that an amount of consumed water was only about 40%.

Comparative Example 3

A charge/discharge test for battery was actually carried out by the method similar to that in Example 1, in which the electrolyte solution was prepared to have a $LiPF_6$ concentration of 1.0 mol/L and a volume ratio between ethylene carbonate and ethyl methyl carbonate of 1:2 for comparisons with the battery charge/discharge tests made in Examples 1, 5 and 6. Results of the evaluation are shown in Table 1. A discharge capacity retention, a cell resistance and a generated gas amount, which were obtained after 500 cycles, were 41%, 30Ω and 1.2 ml, respectively.

Comparative Example 4

A charge/discharge test for battery was actually carried out by the method similar to that in Example 1, in which the electrolyte solution was prepared to have a $LiBF_4$ concentration of 2.0 mol/L and a volume ratio between ethylene carbonate and γ-butyrolactone of 1:4 for comparisons with the battery charge/discharge test made in Example 2. Results of the evaluation are shown in Table 1. A discharge capacity retention, a cell resistance and a generated gas amount, which were obtained after 500 cycles, were 15%, 280Ω and 0.7 ml, respectively.

Comparative Example 5

A charge/discharge test for battery was actually carried out by the method similar to that in Example 1, in which the electrolyte solution was prepared to have a $LiPF_6$ concentration of 1.0 mol/L and a volume ratio among ethylene carbonate, dimethyl carbonate and diethyl carbonate of 2:1:7 for comparisons with the battery charge/discharge test made in Example 3. Results of the evaluation are shown in Table 1. A discharge capacity retention, a cell resistance and a generated gas amount, which were obtained after 500 cycles, were 54%, 22Ω and 1.8 ml, respectively.

Comparative Example 6

A charge/discharge test for battery was actually carried out by the method similar to that in Example 1, in which the electrolyte solution was prepared to have a $LiPF_6$ concentration of 1.2 mol/L and a volume ratio among ethylene carbonate, dimethyl carbonate and ethyl methyl carbonate of 1:1:1 for comparisons with the battery charge/discharge test made in Example 4. Results of the evaluation are shown in Table 1. A discharge capacity retention, a cell resistance and a generated gas amount, which were obtained after 500 cycles, were 47%, 28Ω and 1.7 ml, respectively.

Comparative Example 7

A charge/discharge test for battery was actually carried out by the method similar to that in Example 1, in which the electrolyte solution was prepared to have a LiPF$_6$ concentration of 1.0 mol/L and a volume ratio between ethylene carbonate and γ-butyrolactone of 1:3 for comparisons with the battery charge/discharge test made in Example 7. Results of the evaluation are shown in Table 1. A discharge capacity retention, a cell resistance and a generated gas amount, which were obtained after 500 cycles, were 8%, 360Ω and 0.6 ml, respectively.

Comparative Example 8

A charge/discharge test for a cell of a hybrid capacitor was actually carried out by the method similar to that in Example 7, in which the electrolyte solution was prepared to have a LiPF$_6$ concentration of 1.0 mol/L and a volume ratio between ethylene carbonate and ethyl methyl carbonate of 1:2 for comparisons with the battery charge/discharge test made in Example 8. Results of the evaluation are shown in Table 1. A discharge capacity retention, a cell resistance and a generated gas amount, which were obtained after 500 cycles, were 92%, 18Ω and 0.9 ml, respectively.

TABLE 1

|  | Capacity retention after 500 cycles (%) | Resistance after 500 cycles (Ω) | Generated gas amount after 500 cycles (mL) |
|---|---|---|---|
| Example 1 | 72 | 13 | 0.6 |
| Example 2 | 57 | 62 | 0.6 |
| Example 3 | 83 | 9 | 0.7 |
| Example 4 | 77 | 10 | 0.8 |
| Example 5 | 74 | 12 | 0.5 |
| Example 6 | 74 | 12 | 0.6 |
| Example 7 | 64 | 23 | 0.1 |
| Example 8 | 98 | 7 | 0.3 |
| Comparative Example 3 | 41 | 30 | 1.2 |
| Comparative Example 4 | 15 | 280 | 0.7 |
| Comparative Example 5 | 54 | 22 | 1.8 |
| Comparative Example 6 | 47 | 28 | 1.7 |
| Comparative Example 7 | 8 | 360 | 0.6 |
| Comparative Example 8 | 92 | 18 | 0.9 |

What is claimed is:

1. A method for producing lithium difluorophosphate, comprising the step of:

simultaneously reacting all of a halide other than a fluoride, LiPF$_6$ and water with each other in a nonaqueous solvent, wherein a mole ratio of water to LiPF$_6$ is within a range of from 0.002:1 to 1:1, thereby producing lithium difluorophosphate containing LiPF$_6$, and wherein the halide is 1/n or more times by mole an acid generated by a reaction between LiPF$_6$ and water, provided that n is the number of halogen atoms per molecule of the halide.

2. A method for producing lithium difluorophosphate, as claimed in claim 1, wherein the nonaqueous solvent is at least one solvent selected from the group consisting of cyclic carbonates, chain carbonates, cyclic esters and chain esters.

3. A method for producing lithium difluorophosphate, as claimed in claim 1, wherein the halide is at least one selected from the group consisting of lithium chloride, lithium bromide, silicon tetrachloride, phosphorus trichloride, acetyl chloride, acetyl bromide, propionyl chloride and oxalyl chloride.

4. A method for producing an electrolyte solution for a nonaqueous electrolyte battery, comprising the steps of:

(a) simultaneously reacting all of a halide other than a fluoride, LiPF$_6$ and water with each other in a nonaqueous solvent, wherein a mole ratio of water to LiPF$_6$ is within a range of from 0.002:1 to 1:1, and and wherein the halide is 1/n or more times by mole an acid generated by a reaction between LiPF$_6$ and water, provided that n is the number of halogen atoms per molecule of the halide, thereby producing a solution containing lithium difluorophosphate and LiPF$_6$; and (b) purifying and adjusting the lithium difluorophosphate so that a concentration of the lithium difluorophosphate in the solution is within a range of from 0.01 to 5.0 wt %.

5. A method for producing lithium difluorophosphate, as claimed in claim 1, wherein the reaction is conducted by adding a total amount of the halide at once to the LiPF$_6$ and the water.

6. A method for producing an electrolyte solution for a nonaqueous electrolyte battery, as claimed in claim 4, wherein the reaction of the step (a) is conducted by adding a total amount of the halide at once to the LiPF$_6$ and the water.

* * * * *